(12) United States Patent
Kwon et al.

(10) Patent No.: US 8,045,824 B2
(45) Date of Patent: Oct. 25, 2011

(54) WAVELET TRANSFORMATION-BASED IMAGE ENCODER, DECODER AND METHOD FOR GENERATING THUMBNAIL IMAGE

(75) Inventors: Jae-Hoon Kwon, Seongnam-si (KR); Yong-Hyun Lim, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1074 days.

(21) Appl. No.: 11/894,924

(22) Filed: Aug. 22, 2007

(65) Prior Publication Data

US 2008/0095473 A1   Apr. 24, 2008

(30) Foreign Application Priority Data

Oct. 20, 2006   (KR) .................. 10-2006-0102294

(51) Int. Cl.
*G06K 9/20*   (2006.01)

(52) U.S. Cl. ....................................... 382/282
(58) Field of Classification Search .......... 382/232–234, 382/236, 238–240, 248–250; 348/384.1, 348/394.1–395.1, 398.1–404.1, 408.1, 430.1–431.1; 375/240.02, 240.11, 240.18–240.19; 708/317, 708/400–401; 345/587

See application file for complete search history.

(56) References Cited

U.S. PATENT DOCUMENTS

| | | | | |
|---|---|---|---|---|
| 6,195,459 | B1 * | 2/2001 | Zhu | 382/176 |
| 6,658,158 | B2 * | 12/2003 | Fukuhara et al. | 382/240 |
| 6,763,139 | B1 * | 7/2004 | Andrew | 382/240 |
| 7,302,104 | B2 * | 11/2007 | Suino | 382/240 |
| 7,359,561 | B2 * | 4/2008 | Fukuhara et al. | 382/240 |
| 7,529,420 | B2 * | 5/2009 | Ii | 382/240 |
| 7,760,960 | B2 * | 7/2010 | Yan et al. | 382/261 |

FOREIGN PATENT DOCUMENTS

| | | |
|---|---|---|
| JP | 2000-350208 | 12/2000 |
| JP | 2004-194146 | 7/2004 |
| JP | 2004-226908 | 8/2004 |
| KR | 2002-78345 | 10/2002 |

* cited by examiner

*Primary Examiner* — Jose Couso
(74) *Attorney, Agent, or Firm* — Cha & Reiter, LLC (57) ABSTRACT

Disclosed are a wavelet transformation-based image encoder, decoder and method for generating a thumbnail image. In the present invention, an original image is tiled according to a preset tiling scheme, and wavelet transformation is performed for each tiled image. An LL image is extracted from the tiled image and range mapping is performed for the color values of each pixel of the extracted LL images. After the range mapping of the color values according to the pixels, a thumbnail image is generated by reconstructing the LL images according to the predetermined tiling scheme. According to the present invention as described above, when an encoder using a wavelet transformation method encodes the original image into a wavelet image or a decoder using wavelet transformation method decodes the wavelet encoded image into the original image, the thumbnail image can be easily generated.

21 Claims, 6 Drawing Sheets

WAVELET TRANSFORMATION-BASED IMAGE ENCODER, DECODER AND METHOD FOR GENERATING THUMBNAIL IMAGE

CLAIM OF PRIORITY

This application claims to the benefit of the earlier filing date, pursuant to 35 USC 119, to that patent application entitled "Wavelet Transformation-Based Image Encoder, Decoder and Method for Generating Thumbnail Image" filed with the Korea Intellectual Property Office on Oct. 20, 2006 and assigned Serial No. 2006-102294, the contents of which are incorporated herein by reference.

BACKGROUND OF THE INVENTION

1. Field of the Invention

The present invention relates to display presentation of thumbnail images and more particularly to a method for generating a thumbnail image according to a wavelet transformation scheme in the encoding or decoding of an image based on the wavelet transformation scheme.

2. Description of the Related Art

Generally, a thumbnail image refers to a small size image used for image preview and so on.

Figure 1:
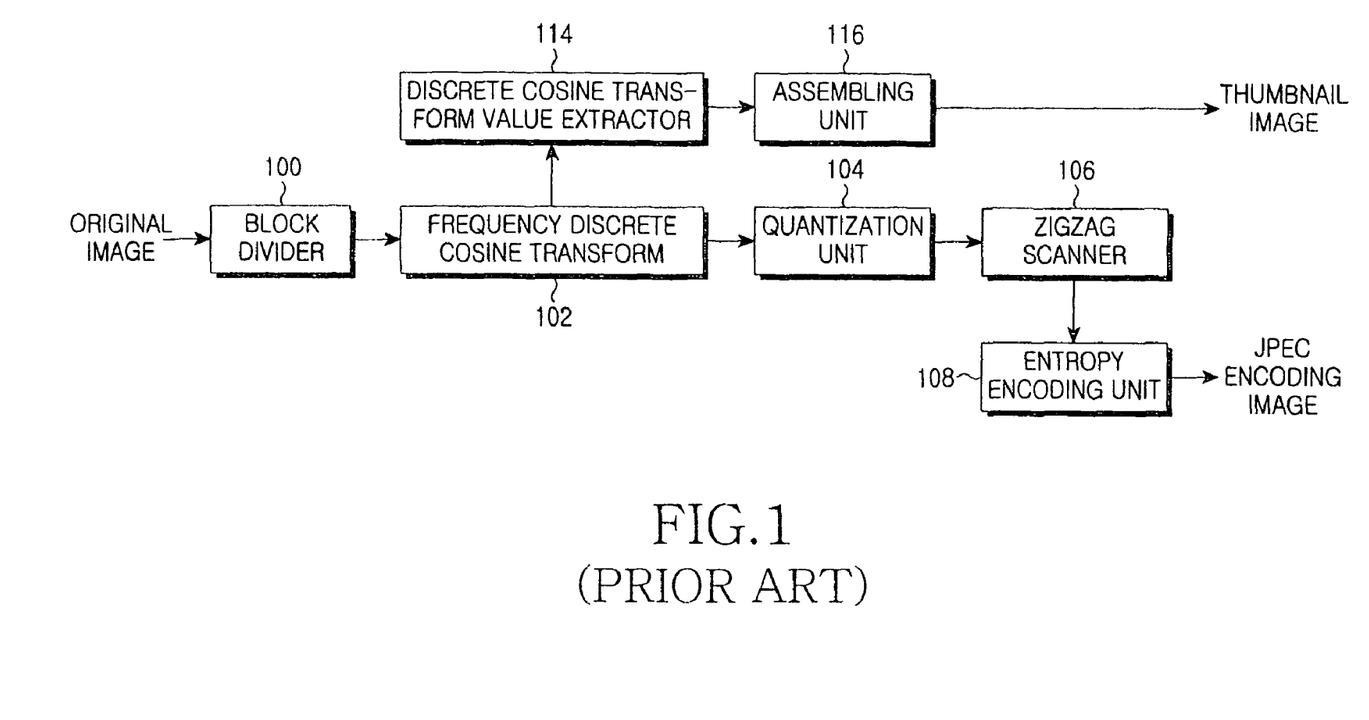
FIG. 1 is a block diagram illustrating a block configuration of a conventional JPEG encoder.

FIG. 1 is a block diagram illustrating the configuration of a conventional JPEG encoder capable of generating the thumbnail image.

Referring to FIG. 1, a conventional JPEG encoder includes a block divider 100, a Frequency Discrete Cosine Transform (FDCT) 102, a quantization unit 210, a zigzag scanner 106, and an entropy encoding unit 108. The JPEG encoder further includes a discrete cosine transform value extractor 114 connected to the FDCT 102, and an assembling unit 116 in order to generate the thumbnail image.

According to a method by which the JPEG encoder encodes an original image, the block divider 100 divides the original image into blocks of a preset size (e.g. 8 pixel×8 pixel), and the FDCT 102 performs the discrete cosine transformation on each of the divided blocks. The discrete cosine transform value (DCT value) extractor 114 extracts the discrete cosine transform value. The quantization unit 210 receives the extracted DCT values, and performs quantization by using a predetermined quantization matrix. Here, the quantization matrix refers to an integer matrix randomly generated by a designer, etc. The original image is expressed in the form of a matrix with quantization values.

The zigzag scanner 106 receives the original image expressed in the form of a matrix with the quantization values and transforms the original image in the form of integer rows according to a normal zigzag scanning scheme. Then, the transformed original image is input to the entropy encoding unit 108 to be encoded according to an average code length per symbol, determined by an average information amount called 'entropy', based on the generation probability of data symbols. The entropy encoding method includes a Huffman coding, an arithmetic coding and the like. In this manner an original image is encoded according to the JPEG encoding scheme.

When the JPEG encoder generates the thumbnail image, the FDCT 102 performs a level shift process for each block to create a predetermined number of coding blocks, and computes the average values of discrete cosine values of the coding blocks. The assembling unit 116 configures an image using these computed average values. For example, in the case where a thumbnail image is generated in the form of a (128×128) pixel coding block including 256 blocks of (8×8) pixels through the level shift process, if the original image has a size of (1024×1024) pixels, the created thumbnail image has a size of (128×128) pixels and corresponds to $\frac{1}{8}^{th}$ the size of the original image.

Though the JPEG encoding scheme the size of the original image can be reduced without data loss. Another proposed method, referred to as JPEG 2000, is a wavelet transformation method-based encoding scheme capable of improving the compression rate of JPEG encoding scheme by several orders of magnitude. However, the JPEG 2000 encoding scheme is still problematic in that it can not use the JPEG encoding scheme due to the use of the wavelet encoding scheme.

This is because the wavelet transformation applies a low pass filter and a high pass filter to each row of a two-dimensional image, generates four sub-images, (low-low (LL), low-high (LH), high-low (HL) and high-high (HH)), by performing down sampling, and combines the four sub-band images to generate an output image including the same number of samples as compared to the original image.

Accordingly, it is necessary to provide a method for generating the thumbnail image from the original image in the image encoding or decoding scheme such as a JPEG 2000 based on the wavelet transformation scheme.

SUMMARY OF THE INVENTION

Accordingly, the present invention has been developed to solve the above-mentioned problem occurring in the art. The present invention provides an encoder, and a method for generating a thumbnail image using the wavelet transformation scheme, such as the JPEG 2000, to easily generate a thumbnail image. Also disclosed is a decoder for decoding a wavelet transformed image to produce a thumbnail image.

According to an aspect of the present invention, there is provided an encoder, which includes an image tiling unit for dividing the original image into images of a predetermined number, a wavelet transformation unit for determining a number of the wavelet transformation for each of the divided images, performing the wavelet transformation for each of the divided images according to the determined number and outputting the wavelet transformed data, an extractor for receiving the wavelet transformed data for each of the divided images and extracting only specific wavelet transformed data for each of the divided images, a range mapping unit for performing range mapping for color value of each pixel included in each of the extracted wavelet transformed data and an assembling unit for receiving the range-mapped, wavelet transformed data and reconstructing the data to generate a thumbnail image corresponding to the original image.

In the encoder of the present invention, there is provided a method for generating the thumbnail image, which includes the steps of image tiling for dividing the original image into images of predetermined number, determination of the number of the wavelet transformation for each of the divided images, wavelet transformation for each of the divided images according to the determined number of the wavelet transformation and outputting the wavelet transformed data, extracting only specific wavelet transformed data for each of the divided images, a range mapping for the color value of each pixel included in each of the extracted wavelet transformed data and reconstructing each of the range-mapped, wavelet transformed data to generate a thumbnail image corresponding to the original image.

According to another aspect of the present invention, there is provided a decoder, which includes an entropy decoding unit for entropy decoding of the encoded image according to the wavelet transformation scheme. a bit stream parsing unit for parsing the bit stream of the entropy decoded wavelet encoded image, a low-low (LL) image extractor for receiving the result of the bit stream parsing of the wavelet encoded image and extracting low-low image data from the result and a second range mapping unit for performing range mapping for the color value of pixels included in each of the extracted LL image data and outputting the LL image data as a thumbnail image for the wavelet encoded image.

In the decoder of the present invention, there is provided a method for generating the thumbnail image, which includes steps of entropy decoding of the encoded image according to the wavelet transformation scheme, bit stream parsing of the entropy decoded wavelet encoded image, an LL image extraction of the result of the bit stream parsing of the wavelet encoded image and extracting low-low image data from the result, range mapping for color value of pixels included in each of the extracted LL image data and outputting the LL image data as a thumbnail image for the wavelet encoded image.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, an embodiment of the present invention will be described in detail referring to the accompanying drawings. The same reference numerals are used to denote the same structural elements throughout the drawings. For the purposes of clarity and simplicity, a detailed description of known functions and configurations incorporated herein is omitted to avoid making the subject matter of the present invention unclear.

For aiding the complete understanding of the present invention, a fundamental principle of the present invention will be described. In the present invention, an original image is tiled according to a preset tiling scheme, and wavelet transformation is performed for each tiled image. An LL image is extracted from the tiled image and range mapping is performed for color values of each pixel of the extracted LL images. After range mapping of the color values of the pixels, a thumbnail image is generated by reconstructing the LL images, according to the predetermined tiling scheme.

Figure 2:
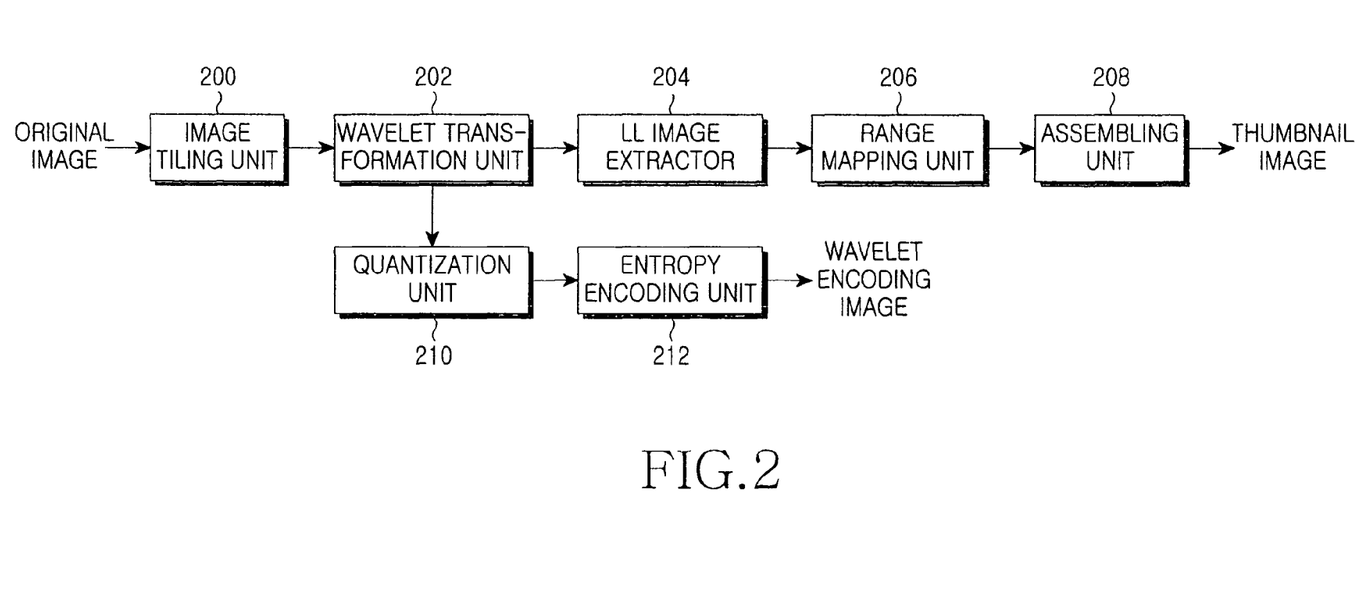
FIG. 2 is a block diagram illustrating a configuration of an encoder according to an embodiment of the present invention.

FIG. 2 is a block diagram illustrating a configuration of an encoder according to an embodiment of the present invention;

Referring to FIG. 2, the encoder according to the embodiment of the present invention includes an image tiling unit 200, a wavelet transformation unit 202, a quantization unit 210, an entropy encoding unit 212, an LL image extractor 204 connected to the wavelet transformation unit 202 to generate the thumbnail image, a range mapping unit 206 and an assembling unit 208.

The image tiling unit 200 divides the original image into a predetermined number of images by a selection of a user or a designer of the encoder according to the embodiment of the present invention. The number of the divided images can be randomly set by the user or the designer. If the original image is simply encoded by the wavelet transformation scheme instead of generating the thumbnail image from the original image, the image tiling unit 200 inputs the original image to the wavelet transformation unit 202 without dividing the input original image, and allows the wavelet transformation to be executed.

However, if the thumbnail image is generated by using the original image, the image tiling unit 200 divides the original image into a plurality of images to input the divided images to the wavelet transformation unit 202. Thus, if the number of the images is set to four, for example, the image tiling unit 200 divides the input original image into four images and inputs the divided image to the wavelet transformation unit 202. Then, the wavelet transformation unit 202 performs the wavelet transformation on each of the four divided images.

In the meantime, the wavelet transformation unit 202 determines the number of the wavelet transformation for each input image. Here, the wavelet transformation unit 202 determines the number of the wavelet transformations for each divided image according to the number of the tiled images, the size of the original image and the size of the thumbnail image. The wavelet transformation unit 202 divides the input original image in the row-direction wavelet transformed data of a high/low frequency band, performs the wavelet transformation in the column-direction of the original image from the row-direction wavelet transformed data, and generates HH image data indicating a diagonal edge component of the high frequency band, LH image data indicating a horizontal signal edge component of the high frequency band, HL image data indicating a vertical signal edge component of the high frequency band and LL image data indicating the low frequency band with no edge component. The wavelet transformation can be repeatedly performed for the LL image data several times. If the wavelet transformation is performed several times and since the corresponding image is divided into the four pieces of image data (LL, HL, LH, HH), the size of the LL image generated from the image input to the wavelet transformation unit 202 is reduced by ¼.

Accordingly, even when the original image and the thumbnail image are of the same size, the number of the images divided through the image tiling process increases, and the number of the wavelet transformations determined for one image decreases. Similarly, as the number of the images divided through the image tiling process decreases, the number of the wavelet transformations determined for one image increases The quantization unit 210 performs quantization for the wavelet transformed image data when the wavelet transformation is completed. The entropy encoding unit 212 receives the quantized image data, compresses the received image data through a Huffman coding or an arithmetic coding method, for example, and outputs wavelet encoded images.

When the thumbnail image is generated from the original image, the LL image extractor 204 extracts only the LL image data from wavelet transformed image data and outputs the extracted LL image data to the range mapping unit 206.

The range mapping unit 206 maps each color value for pixels of the currently extracted LL image data into actual display values. For example, if the extracted LL image data is displayed as a 24 bit RGB image, the range mapping unit 206 maps color values having an R (Red) component, a G (Green) component and a B (Blue) component among the color values of each pixel of the LL image into values in a of range of 0 to 255, respectively. The range of the color values of each pixel in the extracted LL image changes depending on a filter of the wavelet transformation unit 202 and the performed color conversion scheme. Thus the color values of each pixel of the image data generated through the wavelet transformation is scaled into values within a predetermined range through the range mapping. The LL image data in which the pixel color values have been mapped are output to the assembling unit 208.

After all the LL image data for several divided images are received from the range mapping unit 206, the assembling unit 208 reconstructs the data in a sequence inverse to that in the tiling process, thereby generating the thumbnail image. That is, if the original image is divided into four images through the image tiling process, the assembling unit 208 receives the LL image data for each of the four divided images, and reconstructs the images, thereby generating and outputting the thumbnail image.

Figure 3:
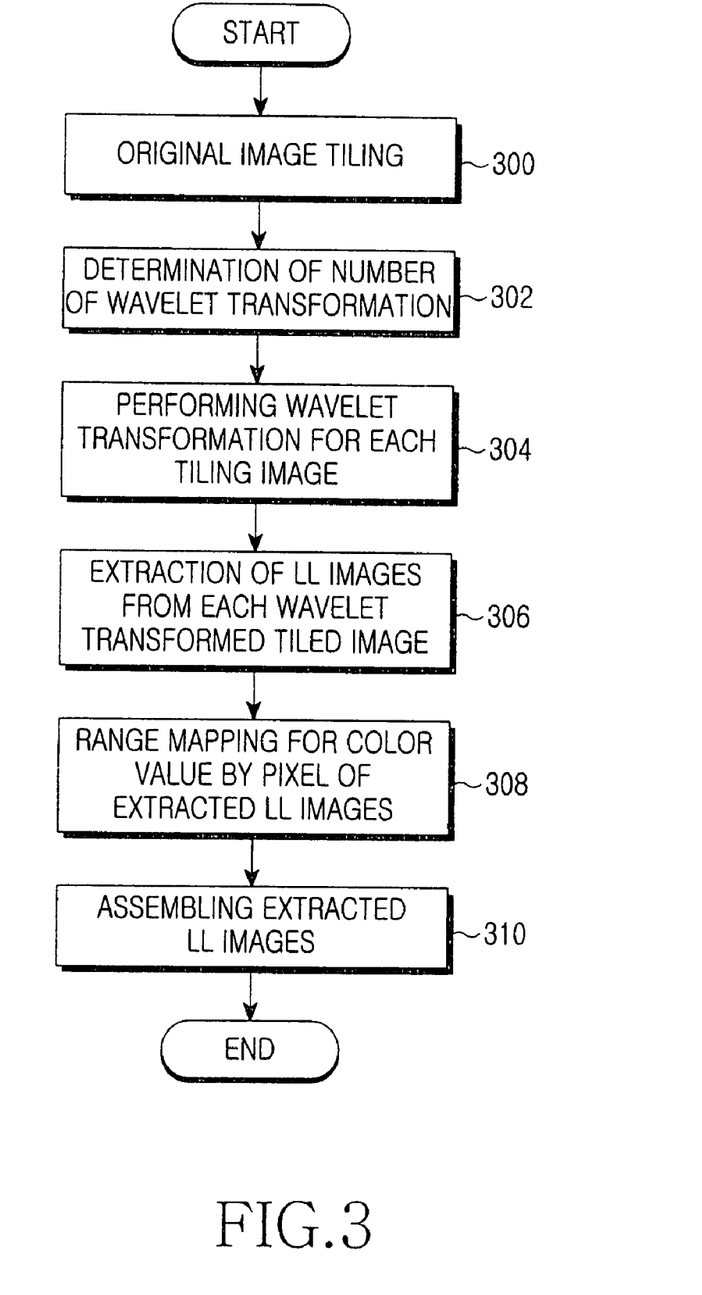
FIG. 3 is a flow chart illustrating an operation process by which the encoder generates a thumbnail image through a wavelet transformation scheme according to embodiment of the present invention.

FIG. 3 is a flow chart illustrating an exemplary process of operation of generating a thumbnail image by the encoder through a wavelet transformation scheme according to one embodiment of the present invention.

Referring to FIG. 3, in a case where the thumbnail image is generated, the encoder according to the embodiment of the present invention tiles the original image according to the predetermined number of "tilings," and divides the image into a plurality of images in step 300. In step 302, the encoder determines the number of the wavelet transformations. Here, the number of times of performing the wavelet transformation is determined by the size of the original image, the size of the thumbnail image and the number of the "tilings." Accordingly, when the number of the "tilings" changes, the number of the wavelet transformation, which is performed for each image divided through the image tiling process of the step 300, may change even though there are no changes in the sizes of the original image and the thumbnail image.

In step 304, the encoder according to the described embodiment of the present invention performs the wavelet transformation. Here, the wavelet transformation process can be repeated more than once according to the number of transformations. For example, when the original image has a size of (1024×1024) pixels and is divided into four images through the image tiling process, if the currently set size of the thumbnail image is a (32×32) pixel, the wavelet transformation process can be repeated five times for each divided image. In this way, the wavelet image data includes four LL image data with a size of 16×16 pixel for the respective images divided from the original image.

In step 306, the encoder according to the embodiment of the present invention extracts only LL data from the generated wavelet data in step 304. The encoder performs the range mapping for the color values of pixels included in the respective LL data in step 308. When the range mapping process is completed, the encoder according to the embodiment of the present invention reconstructs the currently extracted LL data, and, thus generates in step 310 one thumbnail image from the image data divided in step 300. Accordingly, the encoder according to the embodiment of the present invention can generate the thumbnail image in accordance with the wavelet transformation scheme.

FIG. 4 is a view illustrating generation of the thumbnail image by the encoder through a wavelet transformation scheme according to another embodiment of the present invention.

Figure 4A:
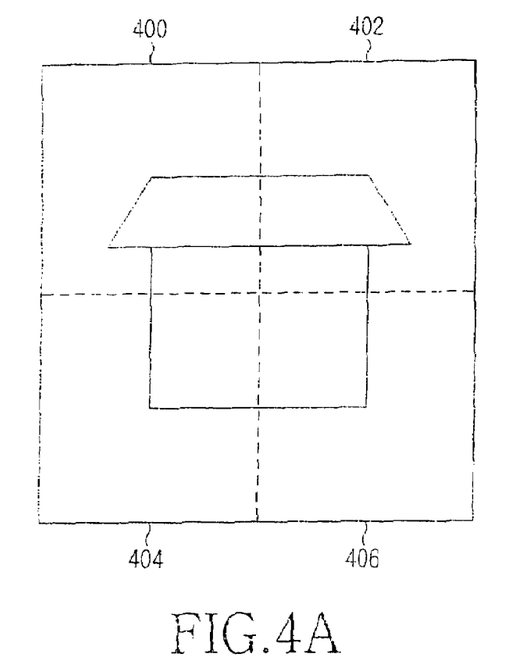
FIG. 4 is an exemplary diagram illustrating a thumbnail image generated by the encoder through a wavelet transformation scheme according to an embodiment of the present invention.
Figure 4B:
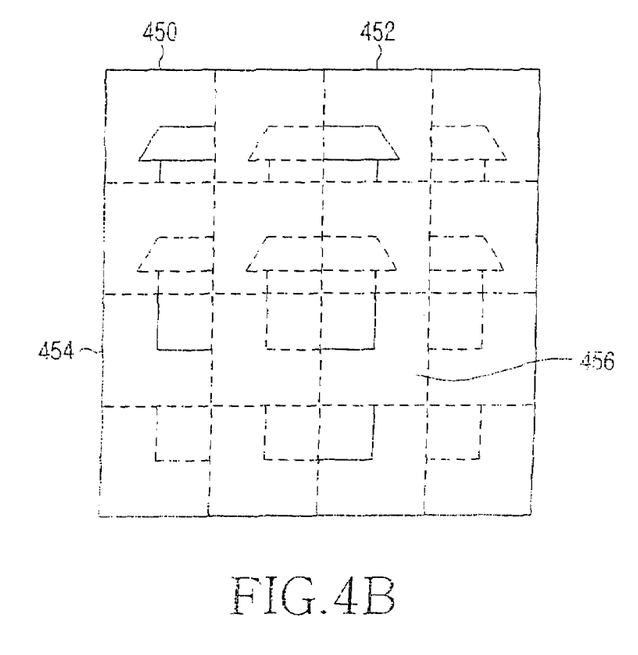

Referring to FIGS. 4A-4C, FIG. 4A illustrates the process of tiling, an original image into four images 400, 402, 404 and 406 according to the four image tiling processes. The wavelet transformation unit 202 performs the wavelet transformation for each divided image as shown in FIG. 4B.

Therefore, each of the divided images 400, 402, 404 and 406 are converted into four image data (LL, LH, HH, HL image data) through the wavelet transformation process, respectively. In such a case, if only LL image data 450, 452, 454, 456 of the divided images are reconstructed to generate the thumbnail image, the thumbnail image corresponding to one-half of the original image is generated as shown in FIG. 4C.

In this manner, if the wavelet transformation is further performed twice for each of the divided images, the sizes of the current LL image data 450, 452, 454 and 456 are reduced by ¼ respectively as compared to the size shown in FIG. 4B. Accordingly, in this case, if an assembling process, i.e., a reconstruction, is performed, the thumbnail image corresponding to one-eighth ($\frac{1}{8}^{th}$) of the original image is generated. Therefore, the encoder according to the embodiment of the present invention allows the thumbnail image with a preset, known or variable size to be generated from the original image through repetition of the process.

Figure 4C:
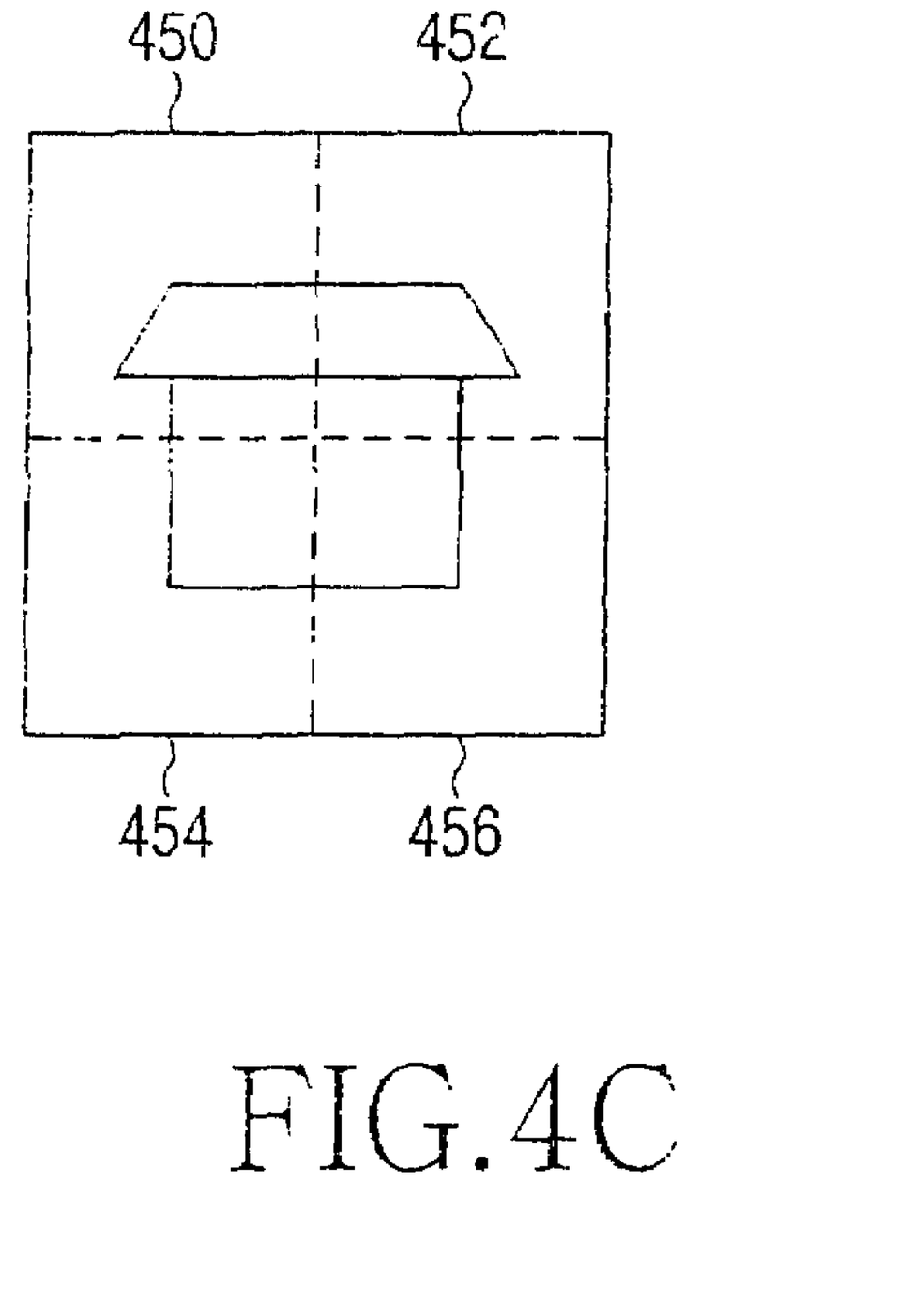

While FIG. 4 shows an example in which the original image is divided into four images through the image tiling process, it would be within the knowledge of those skilled in the art to recognize that the original image can be divided differently according to the user's selection without any limitations. That is, the original image can also be divided into 16 images instead of four images as shown in FIGS. 4A-4C. In this case, the number of the wavelet transformations for the one divided image can be reduced, but the wavelet transformation according to the number of the transformations is performed for the divided images, respectively. The, for example, 16 images may then be reconstructed through the assembling process in step 310, so that one thumbnail image is generated.

As described above, except for the process of encoding the original image according to the wavelet transformation method, the thumbnail image can also be extracted through the process of decoding the wavelet image encoded according to the wavelet transformation method.

Figure 5:
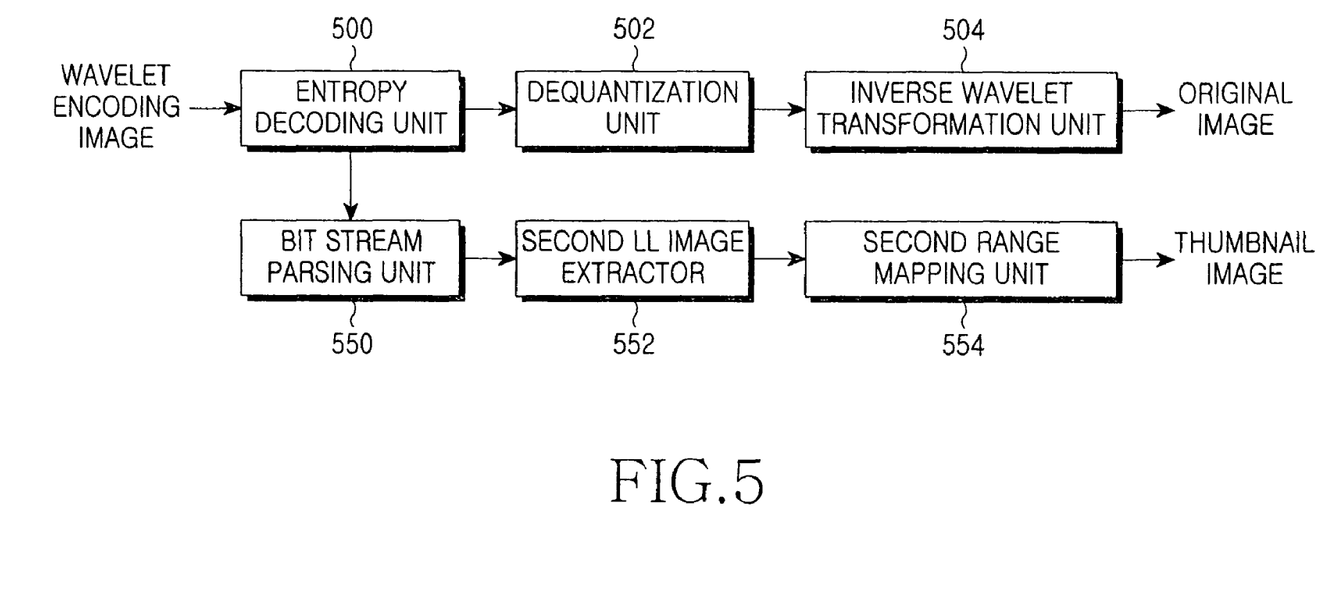
FIG. 5 is a block diagram illustrating a configuration of a decoder according to an embodiment of the present invention.

FIG. 5 is a block diagram illustrating a configuration of a decoder which decodes the image encoded by the wavelet transformation method according to an embodiment of the present invention.

Referring to FIG. 5, the decoder according to the described embodiment of the present invention includes an entropy decoding unit 500 for performing entropy decoding of the image encoded according to the wavelet transformation method described herein, a dequantization unit 502 for dequantizing the entropy decoded image data, and an inverse-wavelet transformation unit 504 for performing the inverse wavelet transformation of the dequantized image data. The decoder decodes the input wavelet encoded image into the original image data.

The decoder according to the embodiment of the present invention further includes a bit stream parsing unit 550, a second LL image extractor 552, and a second range mapping unit 554. Here, the bit stream parsing unit 550 parses the bit stream of the entropy decoded wavelet encoded image. The second LL image extractor 552 receives results obtained by parsing the bit stream, and extracts LL image data from the results. The second range mapping unit 554 performs the range mapping for the color values of pixels included in the respective extracted LL image data. The second range mapping unit 554 outputs the LL image data as the thumbnail image for the wavelet encoded image.

If the size of the LL image data extracted by the second LL image extractor 552 does not coincide with the predetermined size of the thumbnail image, e.g., if the size of the LL image data extracted by the second LL image extractor 552 is smaller than size of the predetermined thumbnail image, then a thumbnail image with a larger size can be generated by performing the inverse wavelet transformation process on the LL image data extracted by the second LL image extractor 552 through the inverse wavelet transformation unit 504. On the other hand, if the size of the LL image data extracted from the second LL image extractor 552 is greater than a predetermined size of the thumbnail image, the image tiling process and the wavelet transformation process are further performed through the wavelet transformation unit, and LL image data is extracted from the results of these processes, so that the thumbnail image according to the predetermined size can be generated from the extracted LL image data.

According to the present invention as described above, when an encoder using a wavelet transformation method encodes the original image into a wavelet image or a decoder using wavelet transformation method decodes the wavelet encoded image into the original image, the thumbnail image can be easily generated.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wavelet transformation-based image encoder apparatus including machine executable code on a non-transitory machine readable medium, the encoder apparatus comprising:
    an image tiling processing unit for dividing an original image into a predetermined number of images;
    a wavelet transformation processing unit including processing means for:
    determining a number of the wavelet transformation for each of the divided images,
    performing a wavelet transformation for each of the divided images according to a known number; and
    outputting the wavelet transformed data;
    an extractor processing unit for receiving the output of wavelet transformed data by the wavelet transformation unit for each of the divided images and extracting only specific wavelet transformed data for each of the divided images;
    a range mapping processing unit for performing range mapping of color values of each pixel included in each of the specific extracted wavelet transformed data; and
    an assembling processing unit including means for:
        receiving the range-mapped, wavelet transformed data; and
        generating a thumbnail image corresponding to an entirety of the original image by assembling the range-mapped, wavelet transformed data.

2. The wavelet transformation-based image encoder as claimed in claim 1, wherein the predetermined number is randomly determined.

3. The wavelet transformation-based image encoder as claimed in claim 1, wherein the known number of the wavelet transformation for each of the divided images is determined according to a size of the original image, a predetermined size of the thumbnail image and the number of the divided images.

4. The wavelet transformation-based image encoder as claimed in claim 1, wherein the specific wavelet transformed data corresponds to a Low-Low (LL) image data among the wavelet transformed data.

5. The wavelet transformation-based image encoder as claimed in claim 1, wherein the wavelet transformation method corresponds to an encoding method according to a JPEG 2000 encoding scheme.

6. A method for generating a thumbnail image from the original image comprising the steps of:
    dividing the original image by an image tiling unit into a predetermined number of images;
    determining a number of wavelet transformations by a wavelet transformation unit for each of the divided images;
    performing wavelet transformation by the wavelet transformation unit for each of the divided images according to the determined number of wavelet transformations and outputting the wavelet transformed data;
    extracting by an extractor unit only specific wavelet transformed data for each of the divided images, wherein the specific wavelet transformed data is data filtered by at least one filter of filters in a wavelet transformation unit;
    range mapping by an image processor for a color value of each pixel included in each of the specific extracted wavelet transformed data; and
    generating a thumbnail image corresponding to an entirety of the original image by assembling each of the range-mapped, wavelet transformed data.

7. The method as claimed in claim 6, wherein the predetermined number is randomly generated.

8. The method as claimed in claim 6, wherein the step of a determination of the number of the wavelet transformation is determined according to a size of the original image, a predetermined size of the thumbnail image and the number of the divided images.

9. The method as claimed in claim 6, wherein the specific wavelet transformed data corresponds to a Low-Low (LL) image data among the wavelet transformed data.

10. The method as claimed in claim 6, wherein the wavelet transformation method corresponds to an encoding method according to a JPEG 2000 encoding scheme.

11. A wavelet transformation based-image decoder apparatus including machine executable code on a non-transitory machine readable medium, the decoder apparatus comprising:
    an entropy decoding processing unit for entropy decoding of an image encoded according to a wavelet transformation method;
    a bit stream parsing processing unit for parsing a bit stream of the entropy decoded wavelet encoded image output by the entropy decoding unit;
    an LL image extractor processing unit for receiving the result of the bit stream parsing of the wavelet encoded image and extracting low-low image data from the result; and
    a range mapping processing unit including processing means for performing range mapping for the color value of pixels included in each of the extracted LL image data and outputting the LL image data as a thumbnail image for the wavelet encoded image.

12. The wavelet transformation based-image decoder as claimed in claim 11, wherein the LL image extractor further comprises:
an inverse wavelet transformation unit for performing the inverse wavelet transformation process.

13. The wavelet transformation based-image decoder as claimed in claim 11 wherein, the LL image extractor generates a larger thumbnail image by performing inverse wavelet transformation process for the extracted LL image data through the inverse wavelet transformation unit when the size of the extracted LL image data is smaller than a predetermined size of the thumbnail image.

14. The wavelet transformation based-image decoder as claimed in claim 11, wherein the LL image extractor further comprises the wavelet transformation unit performing the wavelet transformation for the extracted LL image.

15. The wavelet transformation based-image decoder as claimed in claim 14, wherein the LL image extractor performs the wavelet transformation process for the extracted LL image data from the wavelet transformation unit and extracts the LL image data from the wavelet data according to the result of performing the wavelet transformation process when the size of the extracted LL image data is greater than a predetermined size of the thumbnail image.

16. The wavelet transformation based-image decoder as claimed in claim 11, wherein the wavelet transformation method corresponds to a JPEG 2000 encoding scheme.

17. A method for decoding of an encoded image according to a wavelet transformation method of an original image, said method including the steps of:
entropy decoding by an entropy decoding processing unit for performing the entropy decoding of the encoded image according to the wavelet transformation scheme;
parsing by a bit stream parsing processing unit the bit stream of the entropy decoded wavelet encoded image;
receiving by an LL image extraction processing unit the result of the bit stream parsing of the wavelet encoded image and extracting low-low (LL) image data from the result;
range mapping by a range mapping processing unit for a color value of pixels included in each of the extracted LL image data; and
outputting by the range mapping processing unit the LL image data of which the range mapping has been completed as a thumbnail image for an entirety of the wavelet encoded image.

18. The method as claimed in claim 17, wherein the step of extracting LL image data comprises includes:
inputting the result of the bit stream parsing of the wavelet encoded image and extracting low-low image data from the result to the LL image extraction processing unit;
checking by the image extraction processing unit whether a size of the extracted LL image data coincides with the predetermined size of the thumbnail image or not; and
performing size modification by one of a wavelet transformation unit and an inverse wavelet transformation processing unit for modifying the size of the LL image data in order, to coincide with the predetermined size of the thumbnail image when the size of the extracted LL image data does not coincide with the predetermined size of the thumbnail image.

19. The method as claimed in claim 18, wherein, if the size of the extracted LL image data is smaller than size of the predetermined thumbnail image, the step of performing size modification comprises performing by the inverse wavelet transformation processing unit an inverse wavelet transformation process for the extracted LL image data.

20. The method as claimed in claim 18, wherein, if the size of the extracted LL image data is greater than predetermined size of the thumbnail image, the step of performing size modification comprises performing a wavelet transformation process by the wavelet transformation processing unit for the extracted LL image data and further comprises extracting LL image data from the wavelet data according to the result of the performance.

21. The method as claimed in claim 17, wherein the wavelet transformation method corresponds to an encoding method according to a JPEG 2000 encoding scheme.

\* \* \* \* \*